United States Patent [19]
Orain

[11] Patent Number: 4,988,327
[45] Date of Patent: Jan. 29, 1991

[54] DEVICE FOR TRANSFERRING LOAD THROUGH A ROLLING ELEMENT MOUNTED WITH A PLAIN BEARING, METHODS FOR PRODUCING THE DEVICE, AND A TRANSMISSION JOINT PROVIDED WITH THE LATTER

[75] Inventor: Michel A. Orain, Conflans-Ste-Honorine, France

[73] Assignee: Glaenzer-Spicer, Poissy, France

[21] Appl. No.: 254,691

[22] Filed: Oct. 7, 1988

[30] Foreign Application Priority Data
Oct. 9, 1987 [FR] France .................... 87 13976

[51] Int. Cl.$^5$ .................................................. F16D 3/205
[52] U.S. Cl. .................................... 464/111; 464/132; 464/905
[58] Field of Search .............. 464/111, 122, 123, 124, 464/132, 905

[56] References Cited
U.S. PATENT DOCUMENTS

| | | | |
|---|---|---|---|
| 2,722,115 | 11/1955 | Dunn | 464/124 |
| 4,512,750 | 4/1985 | Orain | 464/111 |

FOREIGN PATENT DOCUMENTS

| | | | |
|---|---|---|---|
| 239427 | 9/1987 | European Pat. Off. | 464/111 |
| 3605746 | 8/1987 | Fed. Rep. of Germany . | |
| 1380557 | 10/1964 | France | 464/905 |
| 2580750 | 10/1986 | France | 464/111 |
| 57-06131 | 1/1982 | Japan | 464/111 |
| 1380123 | 1/1975 | United Kingdom . | |
| 2058294 | 4/1981 | United Kingdom . | |
| 2139321 | 11/1984 | United Kingdom . | |

Primary Examiner—Daniel P. Stodola
Attorney, Agent, or Firm—Wenderoth, Lind & Ponack

[57] ABSTRACT

A roller segment is rotatively mounted on a trunnion and rolls along a track. The trunnion may be one of the arms of a tripod element of a homokinetic joint, in which case the track is carried by the other element of the homokinetic joint. In the unloaded state, the inner peripheral wall of the segment has such a shape that its part deformed under load will have an extended area of contact with the trunnion. The material which defines the wall beyond the section of revolution corresponds to the deflection the segment will undergo in service under the effect of cumulated stresses of bending moment and shear under the effect of the load applied at a point by the track and in the distributed form by the trunnion. Utilization thereof for achieving a conformity whose precision allows a hydrodynamic lubrication.

9 Claims, 5 Drawing Sheets

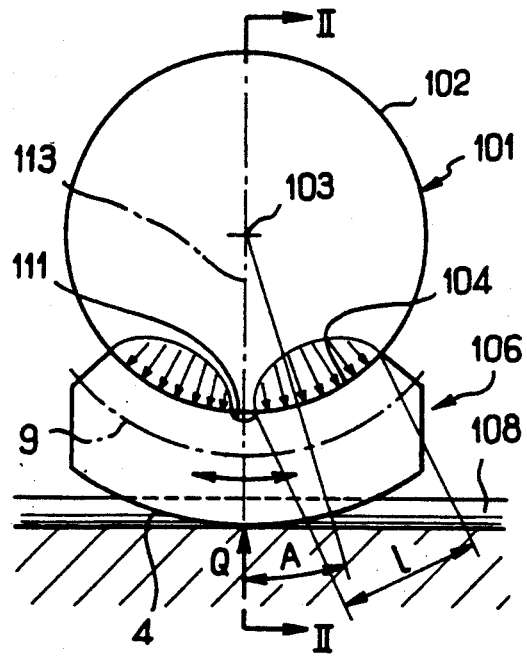
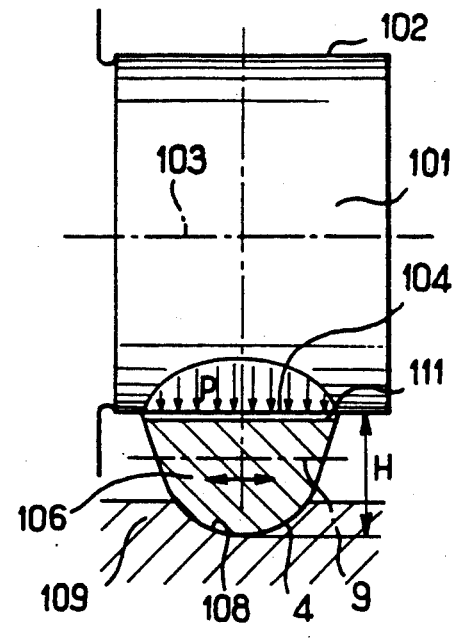
FIG_1    FIG_2
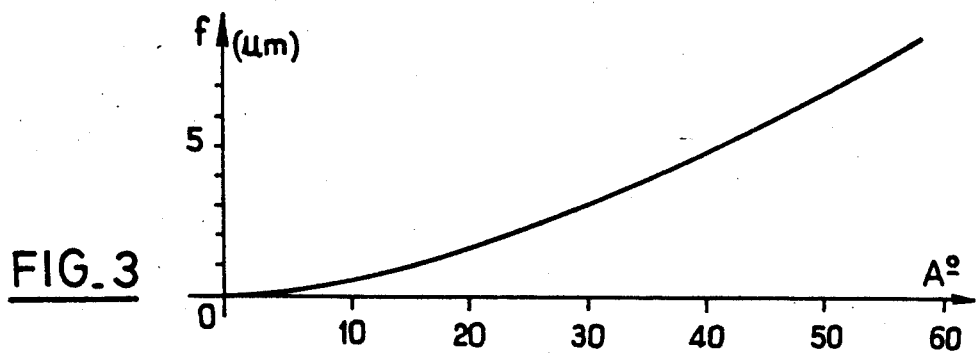
FIG_3
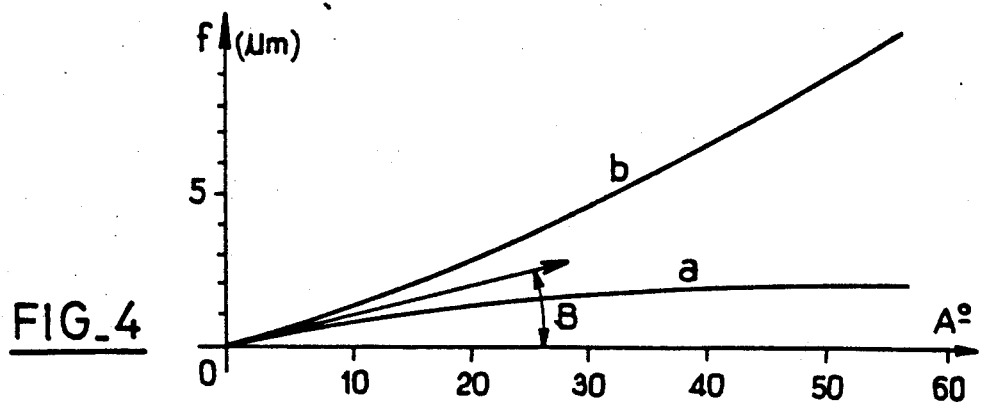
FIG_4

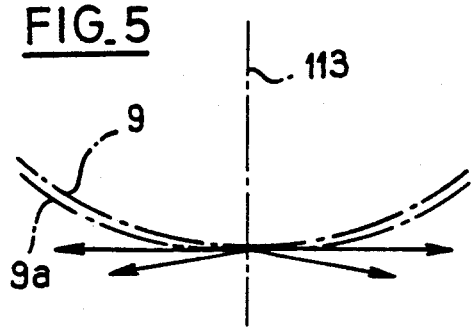
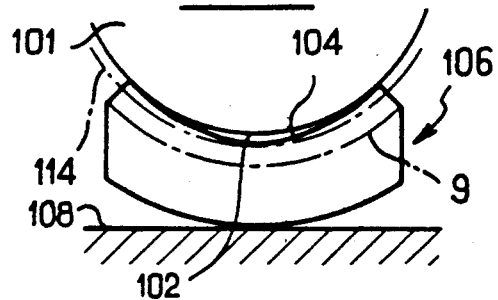
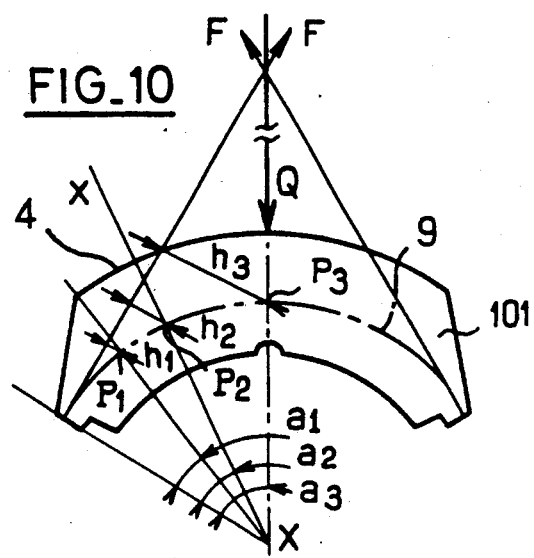
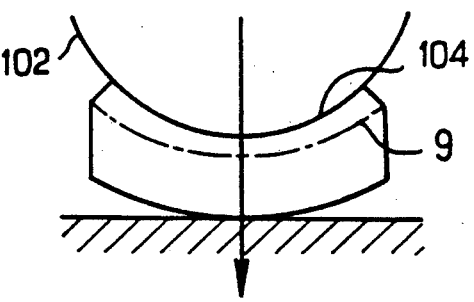
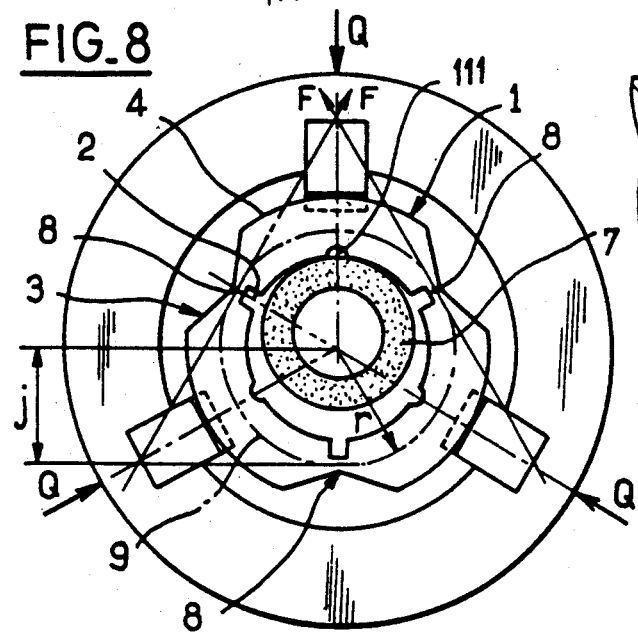
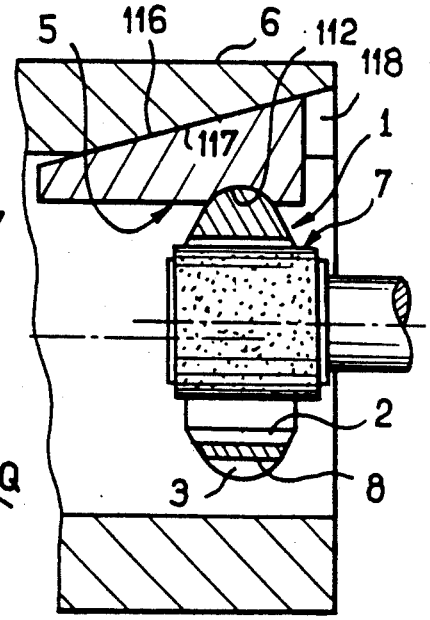

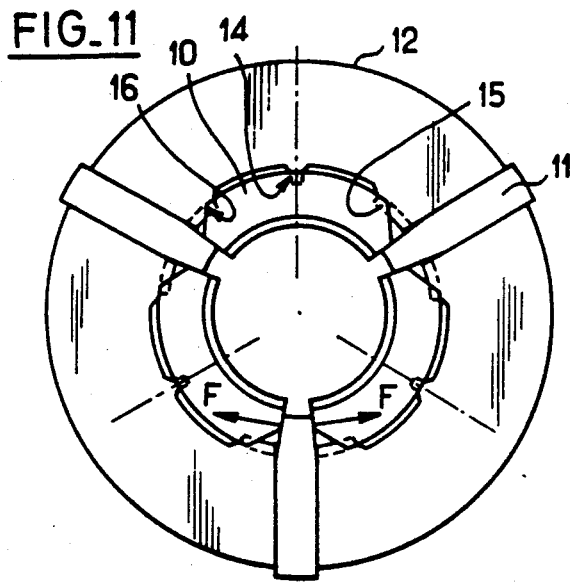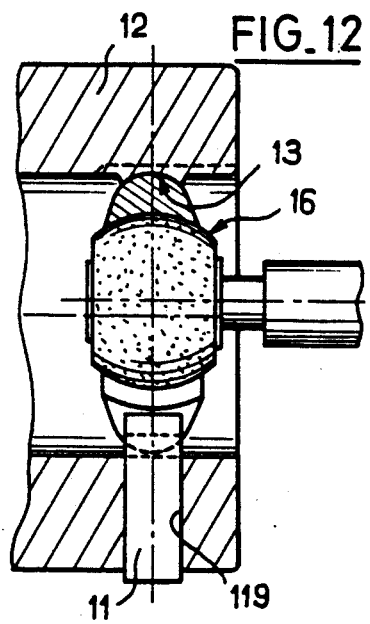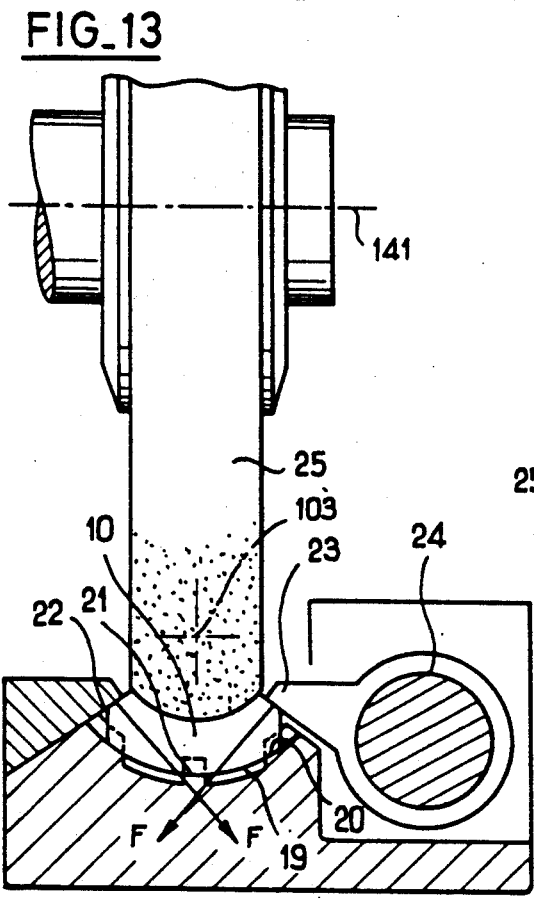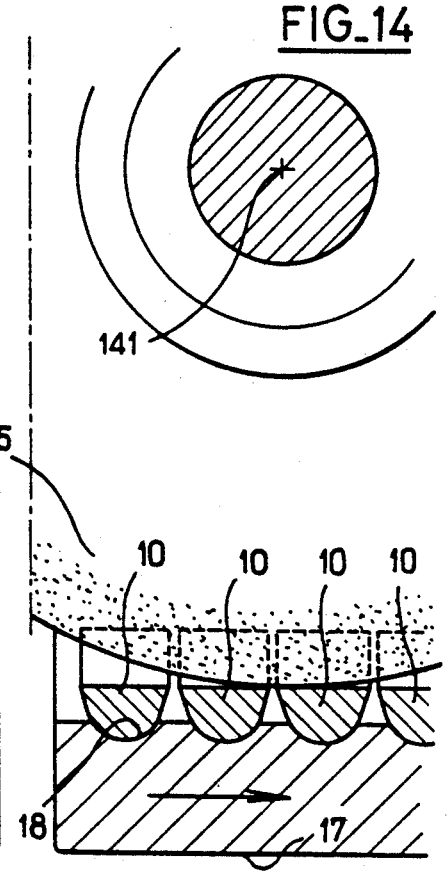

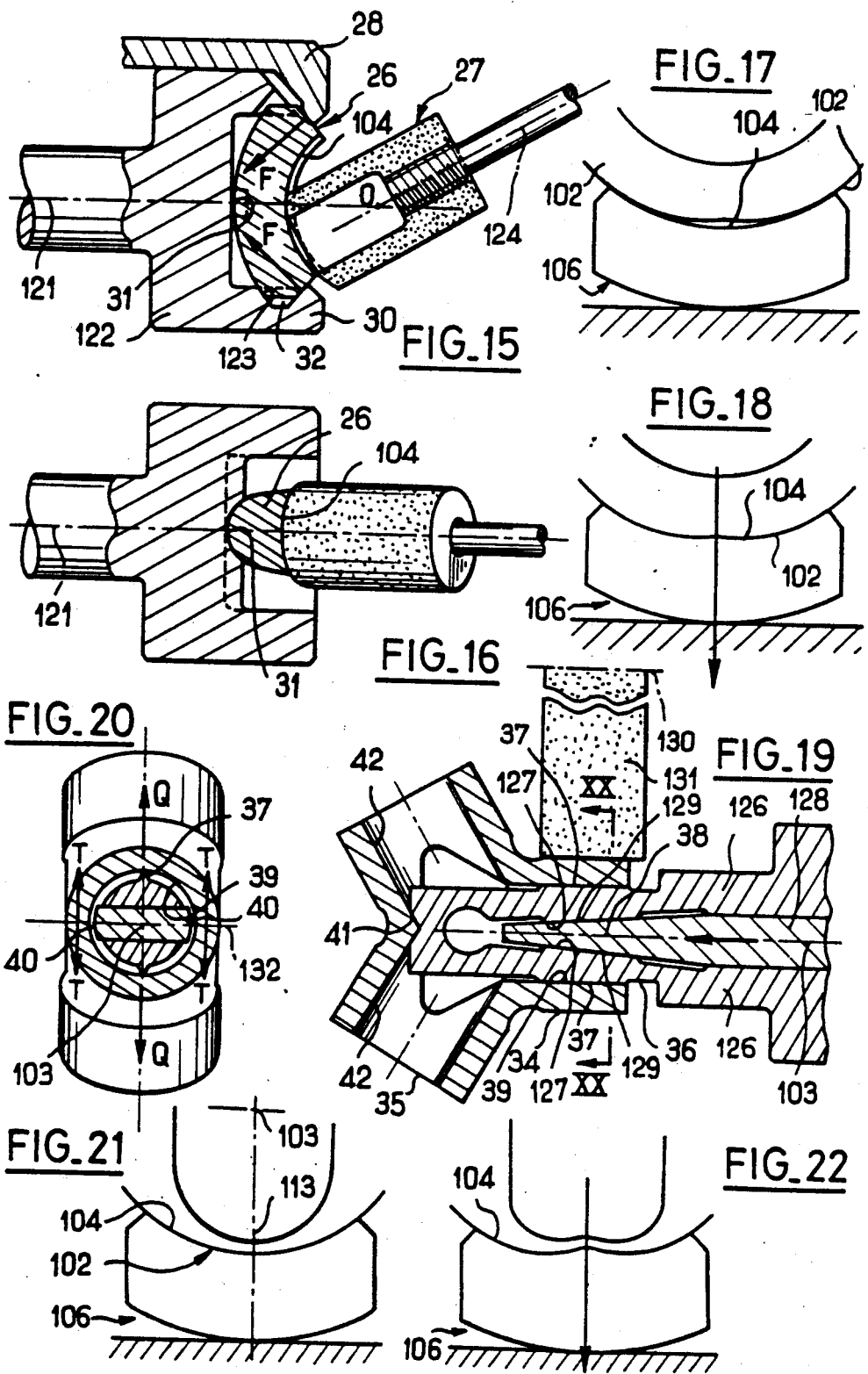

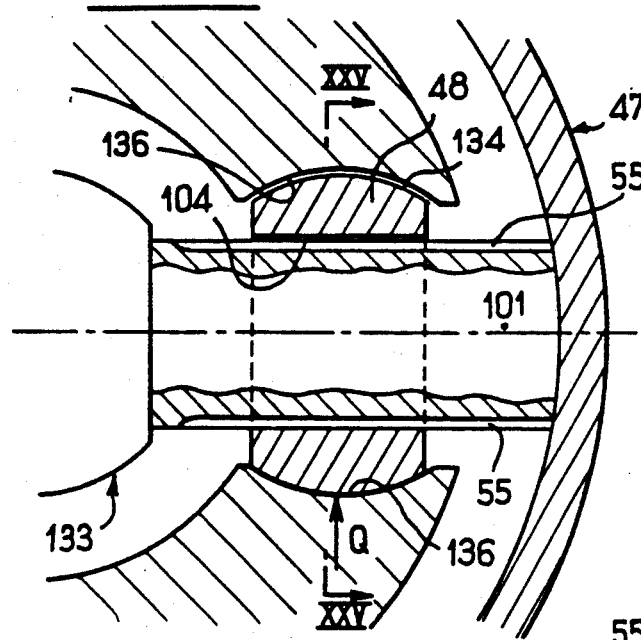
FIG_24
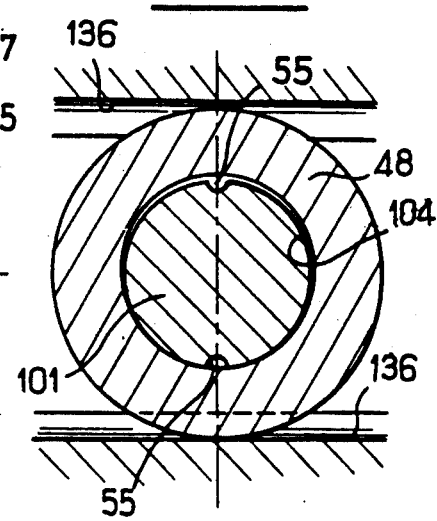
FIG_25
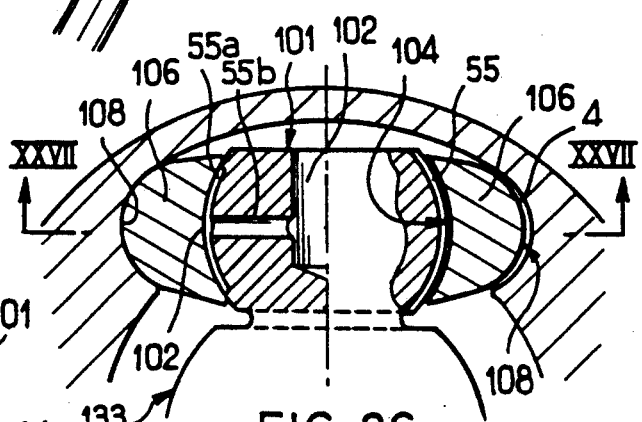
FIG_26
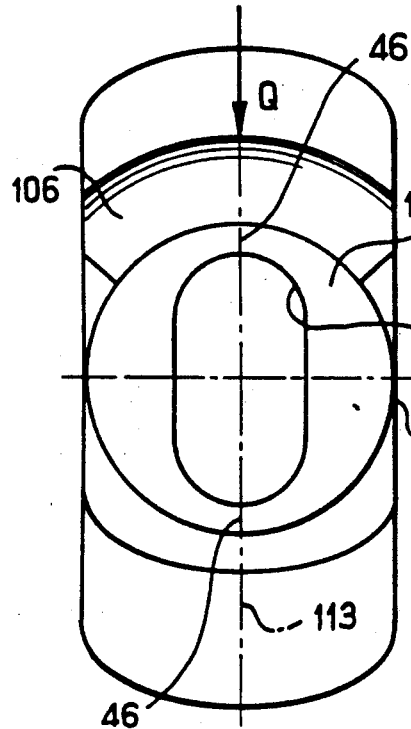
FIG_23
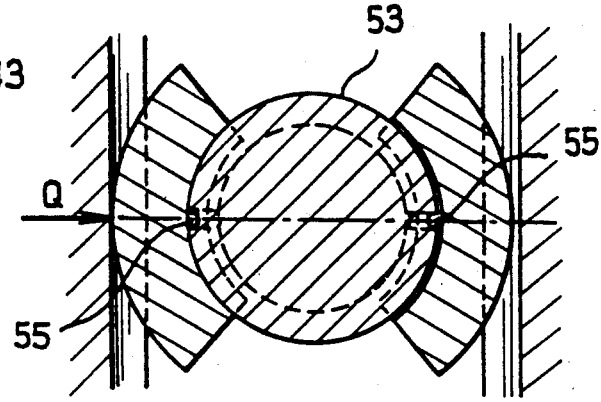
FIG_27

DEVICE FOR TRANSFERRING LOAD THROUGH A ROLLING ELEMENT MOUNTED WITH A PLAIN BEARING, METHODS FOR PRODUCING THE DEVICE, AND A TRANSMISSION JOINT PROVIDED WITH THE LATTER

The present invention relates to a device for transferring a load through a rolling element mounted with a plain bearing on a trunnion and adapted to roll along a track.

The present invention further relates to methods for constructing said device, and in particular the rolling element and the trunnion of the device.

The present invention further relates to an articulated transmission joint equipped with the device.

The rolling elements, such as rollers, roller segments and the like mounted with a plain bearing are of utility in many mechanisms.

These rolling elements comprise an outer rolling surface which may be cylindrical, biconical, toric, spherical, etc. The rolling element rolls along a rolling race or track having a section complementary to the outer surface of the rolling element and is rotatively mounted on a central shaft or trunnion and transfers the effective load between the track and the trunnion.

In some applications, rolling bodies, such as needles, balls or rollers, are interposed between the inner peripheral wall of the rolling element and the outer peripheral wall of the trunnion. However, for applications operating at a low speed of rotation or for reciprocating movements and when a high capacity is required with a small overall size, the devices having rolling bodies interposed between the trunnion and the rolling element, such as a roller, appear to have a relatively lower performance.

These conditions are those especially encountered in homokinetic joints, for example of the tripod type, used for driving automobile wheels. In these joints, each arm of the tripod element, rigidly connected to one of the shafts of the joint, is engaged in an articulated manner between two tracks connected to the other shaft of the joint and parallel to the axis of the latter. A roller, or two roller segments, surround(s) each arm of the tripod element and is or are interposed between the latter and the two tracks. During the operation of these homokinetic joints, the pivoting of each rolling element on its respective trunnion is accompanied by a reciprocating axial movement of translation. The amplitude of this combined movement depends on the flexing angle of operation of the homokinetic joint which varies considerably in the course of use on the vehicle. Likewise, the magnitude of the transmitted load varies widely and in accordance with the driving torque.

These conditions of a combined movement, namely rotation/translation, and a variable load, are a priori very favorable to the rapid and perfect adaptation of the rotatively mounted surfaces by a superpolishing under the express condition that the inner peripheral wall of the roller and the peripheral wall of the trunnion are not unfavorably deformed by the load to be transmitted.

At the present time, the particular geometry essential for obtaining these performances has not yet been achieved and, consequently, needle bearings are in practice adopted, in particular for the sliding tripod joints, owing to the large cyclic frictions produced by the plain bearing.

It has been attempted to improve the conformity between the bearing surfaces, but without really solving the problem.

In particular, it is proposed in FR-A-1 380 557 to grind the trunnion to a section which is complementary to the bent shape of the roller. The improvement in the conformity results in an increased endurance in the case of needle bearing arrangements but is in no way sufficient for ensuring a hydrodynamic lubrication which would be necessary between rollers and trunnions to reduce the friction resulting from a plain bearing arrangement.

It has also been proposed to grind the bore of the roller segments to a radius of curvature less than that of the trunnion or to drill a hole in the trunnion to impart thereto a certain ovalization flexibility. These arrangements somewhat improve the rotatively mounted bearing surface but without reaching under load the quasi perfect conformity necessary for the establishment of the hydrodynamic lubrication essential for the required high capacity and high efficiency.

An object of the invention is therefore to propose a device for transferring load through rolling elements mounted with a plain bearing affording in a given overall size performances of capacity and efficiency which are higher than those of devices having rollers mounted on rolling bodies.

The invention therefore provides a device for transferring load comprising a rolling element, such as a roller, roller segments or the like, having an inner peripheral wall in rotatively mounted contact with a peripheral wall of a trunnion, and an outer surface adapted to roll on a track in such manner as to transfer a load between the track and the trunnion, wherein the geometric features comprising the distribution of the radii of curvature in the unloaded state along said peripheral walls and the rigidity of the trunnion as concerns variations in the radius of curvature of its peripheral wall are such that, under load, the area of conformity between the trunnion and the rolling element is relatively extended notwithstanding the deformations of the roller under the effect of bending on each side of an axial plane containing the line of contact between the track and the rolling element.

According to the invention, the device is characterized in that the geometric features are such that, under load, at least in a region located on each side of said axial plane, the peripheral wall of the trunnion is substantially complementary to the inner peripheral wall of the rolling element as deformed under the effect of two cumulated stresses, on one hand, a bending moment and, on the other hand, a shear force, each due at every point of the rolling element in said region, to the part which is located beyond the point relative to the axial plane, of the load to be transmitted applied in a distributed manner in the region to the inner peripheral wall of the rolling element bearing against the track A roller segment or the loaded region of a roller, behaves, on each side of the axial plane, as a beam inserted between the trunnion and the track in the axial plane and subjected to a distributed load on the part of the trunnion. Prior attempts to improve the result did not solve the problem of the reciprocal conformity of the bearing walls of the roller and trunnion, since they only took into account the bending of the roller under the effect of the aforementioned load. They all resulted in compensations under load which had a parabolic shape according to which the curvature of the presumed deflection of the roller as a function of the distance relative to the axial insertion plane has a zero slope at the origin (i.e. for a point in the plane). This applies both to the case of the arrangement disclosed in FR-A-1 380 557 which explicitly has for purpose to compensate for the bending of the roller, and to other types of compensation proposed, namely the grinding to the complementary section of the bend, or the rendering of the trunnion diametrically more flexible.

Now, it has been found according to the invention that the roller or the roller segment generally presents a very high ratio of its thickness H to its semi-length 1. Moreover, it supports a concentrated load Q on the part of the rolling race or track. Consequently, there is at every point a shear force T and a transverse shear stress (a stress of the so-called "tangential" type but which is in fact directed radially), causing a radial sliding of the successive sections of the roller or segment with respect to one another. In each point of the segment, the shear force is determined by the distributed load applied through the trunnion beyond this point relative to the axial plane of insertion. The shear stress is therefore maximum in the immediate vicinity of the insertion and consequently the curve giving the deflection due to the shear force as a function of the distance from the axial insertion plane has a maximum slope at the origin. Thus, the resulting curve giving the total deflection under the effect of the cumulated bending and shear stresses has, in particular in the vicinity of its origin, a shape which is very different from the curve which takes into account only the bend.

It can be in particular verified that the component of the radial deflection measured on the neutral fibre and due to the shear force is preponderant in the whole of the median part of the bearing region between the roller and the trunnion and for angles ranging up to about $+20°$ and $-20°$.

Thus, in defining the geometrical features which are the distributions of the radii of curvature along the bearing walls of the rolling element and the trunnion, and the rigidity of the trunnion as concerns variations in the radius of curvature of its peripheral bearing wall, in defining these features for taking into account a deformation of the rolling element under the cumulated effect of the shear and bending stresses, a quasi-perfect conformity is obtained under load of the bearing surfaces of the rolling element and the trunnion in a particularly extended angular latent which may be the total angular extent in the case of a roller segment.

Under these conditions, a rapid running-in at the beginning of the utilization ensures the final removal of the asperities remaining after grinding and permits the formation of a continuous film of lubricant on the order of 1 $\mu$m or even 1/10th of a $\mu$m capable of withstanding a pressure of more than 40 MPa. The very low temperature of operation results in a excellent efficiency close to that of bearings having needles and typical of the hydrodynamic lubrication by viscosity. Load transferring devices employing a plain bearing according to the invention have higher capacity performances combined with a astonishingly high mechanical efficiency.

According to another of its aspects, the invention concerns a transmission joint comprising two elements, one of which carries pairs of tracks extending substantially axially whereas the other carries substantially radially extending trunnions, each trunnion being engaged between two tracks of a respective pair while a rolling element is interposed between each track and the associated trunnion so as to roll along the track and be in plain bearing contact with the trunnion, characterized in that each track forms with the associated rolling element and trunnion a device according to the first aspect of the invention.

According to a third aspect of the invention, the method for producing the rolling element of a device according to the first aspect is characterized in that it comprises subjecting an outer wall of a blank of the rolling element to a concentrated radial force substantially corresponding in magnitude and in position to a typical load which will have to be transmitted in service, and balancing this concentrated radial force by two substantially tangential forces symmetrically applied o each side of the concentrated radial force at a distance from the latter, and machining the inner peripheral surface of the blank in such manner as to impart thereto a shape of revolution about an axis which will be in service the axis of the rotation of the rolling element.

This aspect of the invention is based on the idea of machining in revolution the wall of the bearing of the rolling element while the rolling element is subjected to a loading mode which resembles that which is desired in service. By "loading mode" is meant the distribution of pressure along the bearing walls. Thus, when unloaded, there will be no conformity between the rolling element and the trunnion. On the other hand, in service and under load, the conditions of equilibrium will be such that the desired loading will be achieved and the rolling element will resume substantially its quasi-perfect shape of conformity with that of the trunnion. Thus, the loading mode which was desired for the real service conditions is realized.

As it is impossible to machine the inner peripheral wall of the rolling element while subjecting the latter to the distributed load it will receive in service, it has been imagined in accordance with this aspect of the invention to replace this distributed load by concentrated loads which produce substantially the same deformations as the distributed load. These concentrated forces are the two tangential forces applied to the circumferential ends of the conformity region. Indeed, each of these forces has, relative to any point of the neutral fibre, a leverage which, bearing in mind that the curvature of the neutral fibre, increases substantially as the square of the distance between the point of application of the tangential force and the considered point of the neutral fibre. The bending moment resulting from the tangential concentrated force is therefore proportional at each point to the square of the distance between the point of application of the tangential force and the considered point. Furthermore, the tangential concentrated force has a radial component which produces shear stress which is zero at the point of application and increases up to the axial plane in which the concentrated radial force is applied. In all, there is actually obtained in the blank a distribution of the bending moments and forces which resembles that resulting from the real loading mode desired in service.

According to a fourth aspect of the invention, the method for producing the trunnion of a device according to the first aspect of the invention is characterized in that it comprises placing in a bore of a blank of the trunnion a spreading tool which applies an outwardly directed concentrated radial force at at least two angularly spaced apart localized places in the wall of the bore so as to reduce the radius of curvature of the blank in the vicinity of these places, and grinding an outer peripheral wall of the blank in accordance with a shape which is of revolution about an axis of the blank.

In this case, the rolling element may have an inner peripheral wall whose shape in the unloaded state is of revolution. The trunnion has a peripheral wall which has under load a shape which is complementary to that which will be assumed by the inner peripheral wall of the roller under load.

Indeed, the tool introduced inside the trunnion during the machining will create a localized loading of the trunnion in the future axial plane of the insertion of the rolling element, and tangential tensile reactions in the tubular wall of the trunnion between the places of application of the concentrated forces. The tangential forces are exerted in the tensile direction while the concentrated forces are exerted radially outwardly. It will be understood from the explanations provided in respect of the third aspect of the invention, that this loading mode will simulate that which would result from the concentrated forces balanced by a distributed load on the outer peripheral wall of the trunnion. The deformation of the neutral fibre of the trunnion during the machining therefore has a shape which is of the same type as the deformations envisaged hereinbefore for the rolling element. Thus, when the stress will be released after machining, the outer peripheral wall of the trunnion will undergo in the region of conformity variations in the radius of curvature in the increasing sense. If it is assumed that the trunnion is substantially undeformable under the effect of the loadings foreseen in service, the correction effected in manufacture will be such that the peripheral section of the trunnion will correspond to the deformed shape of the inner peripheral wall of the roller in service and under load. In the most frequent case in which the tubular trunnion has, under load in service, a certain deformability, the correction effected in the course of the machining is smaller and has only for effect to compensate for the difference in deformability between the roller and the trunnion.

Other features and advantages of the invention will b apparent from the following description.

BRIEF DESCRIPTION OF THE DRAWINGS

In the accompanying drawings, given by way of non-limitative examples:

FIG. 1 is a diagrammatic view of a device for transferring load through a roller having a plain bearing;

FIG. 2 is a sectional view in the plane II—II of FIG. 1, the trunnion not being shown in section;

FIG. 3 is a diagrammatic graph of the deflection in the roller segment under load as a function of the angular position of the considered point of the neutral fibre about the axis of the trunnion, only the bendings stress being considered;

FIG. 4 is a diagrammatic graph of the deflection in the roller segment under load as a function of the angular position of the considered point of the neutral fibre about the axis of the trunnion, taking into consideration on the one hand the shear alone (curve a) and on the other hand the cumulated shear-bending (curve b);

FIG. 5 is a view in a very exaggerated form of the deformation of the neutral fibre of the roller segment under load;

FIGS. 6 and 7 are diagrammatic views of a first embodiment of the device according to the invention respectively in the unloaded state and in the loaded state with exaggeration of the differences relative to the shapes of revolution;

FIG. 8 is an end elevational view of a device for grinding the inner peripheral wall of a blank of three roller segments of a device according to FIGS. 6 and 7;

FIG. 9 is an axial sectional view of the device of FIG. 8;

FIG. 10 is an explanatory view of the segment obtained by means of the device of FIGS. 8 and 9, to an enlarged scale ;

FIG. 11 is an end elevational view of a device for grinding the inner peripheral wall of three blanks of roller segments of the device according to FIGS. 6 and 7;

FIG. 12 is an axial sectional view of the device of FIG. 11;

FIG. 13 is a cross-sectional view of a device for grinding the inner peripheral walls of a series of blanks of roller segments for the load transferring device according to FIGS. 6 and 7;

FIG. 14 is longitudinal sectional view of the grinding device according to FIG. 13;

FIGS. 15 and 16 are two axial sectional views in two planes at 90° to each other, of a fourth device for grinding the roller segments having spherical bearing surfaces intended for a load transferring device according to FIGS. 6 and 7;

FIGS. 17 and 18 are views similar to FIGS. 6 and 7 but concerning a second embodiment of the device according to the invention;

FIG. 19 is an axial sectional view of a device for grinding the outer peripheral wall of a trunnion intended to be part of a load transferring device according to FIGS. 17 and 18, this trunnion pertaining to a tripod element of a homokinetic joint;

FIG. 20 is a sectional view in plane XX—XX of FIG. 19;

FIGS. 21 and 22 are similar to FIGS. 6 and 7 respectively but concern a third embodiment of the load transferring device according to the invention;

FIG. 23 is a view of a homokinetic joint tripod element in the direction along the axis of one of its trunnions and of a roller associated with this trunnion and forming therewith a load transfer device according to FIGS. 21 and 22;

FIG. 24 is a diagrammatic partial sectional view, in the plane of the axes of the trunnions, of a homokinetic joint having a roller which is externally spherical;

FIG. 25 is a sectional view in the plane XXV-XXV of FIG. 24;

FIG. 26 is a view similar to FIG. 24 but concerning a homokinetic joint having roller segments which are internally spherical and externally toric, FIG. 27 is a sectional view in the plane XXVII-XXVII of FIG. 26. Detailed Description of the Preferred Embodiments FIGS. 1 and 2 diagrammatically represent a load transfer device comprising a trunnion 101 which may be an arm of a tripod element of a homokinetic joint and whose outer peripheral wall 102 has a shape which is substantially of revolution (cylindrical in the represented embodiment) about an axis 103. Bearing on the peripheral wall 102 with a plain bearing is an inner peripheral wall 104 of a roller segment 106 whose generally toric-shaped outer surface 4 rolls in a rolling track 108, having a complementary section, of an element 109 which may be constituted by a bowl element of a homokinetic joint. During the operation of the homokinetic joint, the segment 106 pivots on the trunnion in the circumferential direction as indicated by the double arrow marked on the roller segment in FIG. 1, and at the same time undergoes on the trunnion an axial reciprocating motion as illustrated by the double arrow in FIG. 2.

The roller segment 106 must transmit a load Q between the trunnion 101 and the track 108. It is desired that the load Q be uniformly distributed throughout the inner peripheral wall 104 of the segment 106 in the form of a mean pressure p. The desired uniformity does not exclude that the segment 106 carry one or more transverse lubricating grooves 111. This groove may be replaced by one or more grooves having the same direction on the surface 102 of the trunnion 101.

Such a distribution of the pressures, which is necessary to ensure that the plain bearing mounting of the segment 106 on the trunnion 101 occurs in a viscous hydrodynamic lubricating mode, requires a perfect conformity, or complementarity, of the walls 102 and 104 under load, which can only be obtained if the segment and/or the trunnion conform to special geometrical arrangements.

Indeed, there is observed under load an increase in the radii of curvature of the neutral fibre 9 and of the inner peripheral wall 104 of the segment 106. If the trunnion 101 is substantially rigid with respect to variations in the radius of curvature of its peripheral wall 102 and if, in the unloaded state, the walls 102 and 104 are exactly complementary, there will result a steeply decreasing distribution of the pressure between the trunnion 102 and the roller 106 from the axial plane 113 of insertion toward each circumferential end of the segment 106. The plane 113 is termed the insertion plane since, on each side of this plane, the segment 106 behaves in the manner of an inserted beam subjected to a distributed load.

This is the reason why, in prior attempts to improve the distribution of the pressure applied to the inner peripheral wall of the segment, it was attempted to compensate for the deflection of the segment under the effect of the bending stress. FIG. 3 represents an example of the radial deflection measured in micrometres which the inner peripheral wall of a rolling element will undergo under the effect of the bending stress resulting from a distributed load, as desired for the contact between the roller and trunnion. It will be observed that the deflection f increases substantially as the square of the angle A between the considered point and the insertion plane 113.

Thus, in order to compensate for the harmful effects of the deformation of the roller segment under load, the prior solutions consisted in designing the load transfer device with a segment whose inner peripheral wall is ground to a smaller radius of curvature than that of the outer peripheral wall of the trunnion so that, under load, the increase in the radius of curvature of the inner peripheral wall 104 under the effect of the bending stress here gives to the latter a shape of revolution which is complementary to that of the trunnion. It was found that these methods only poorly improved the distribution of the pressure under load in the region located in proximity to the load.

The invention is based on the observation that the roller, or roller segment, has a very large ratio of its thickness H to its semi-length 1. Consequently, the deformations resulting from the bending moment do not have such an importance that all the other deformation modes are to be neglected. In particular, the roller is the center of a shear force which, in each plane having the reference angle A it makes with the insertion plane 113, is equal to the total force applied to the wall 104 between this plane and the circumferential end of the segment 106 which is closest to the plane.

The curve a (FIG. 4) represents, as a function of the angle A, the radial deflection measured on the neutral fibre due to the shear force termed T. For any angle A, the tangent of the angle of the slope of the curve a is equal to the shear force (such as defined hereinbefore as a function of A) multiplied by 1/SG, in which:

S the cross-sectional area of the roller;

G modulus of elasticity in shear of the steel.

In particular, in the plane 113, the angle B of the slope is such that:

$$\tan B = Q/2SG$$

Q being the total load supported by the roller. Thus, according to the present invention, the quasi-perfect conformity, necessary for the viscous hydrodynamic lubrication, is obtained for a roller or roller segment by adding to the compensation which would result from the curve of FIG. 3 a compensation represented by the curve a of FIG. 4. In this way there is obtained a total compensation represented by the curve b of FIG. 4 which is the sum of the curve a and the curve shown in FIG. 3. The curve b defines the total radial deflection to be compensated, measured on the neutral fibre, for achieving the desired hydrodynamic lubrication.

FIG. 5 shows, in a very exaggerated manner the difference between the undeformed circular neutral fibre 9 and the deformed fibre 9a, the deflection the invention proposes to compensate for. Bearing in mind the non-zero angle B (FIG. 4), the deflection to be compensated increases relatively rapidly on each side of the plane 113, in contrast to what would result from taking into account the bending alone. The arrows represent the different tangents for the curves 9 and 9a on the plane 113.

According to a first embodiment of the invention (FIGS. 6 and 7), the trunnion 101 has, as concerns variations in its radius of curvature under the effect of the forseeable loads Q in service, a rigidity which is great with respect to the rigidity of the segment 106 as concerns variations in the radius of curvature of its wall 104. The peripheral wall 102 of the trunnion 101 is of revolution. The roller segment 106 has an inner peripheral wall 104 which has substantially the shape which would result from the addition on the complementary surface 114 of the wall 102 of a radial thickening equal at each point to the forseeable delection at this point in accordance with the curve b of FIG. 4. Thus, the wall 104 has in a plane perpendicular to the axis 103 (plane of FIGS. 6 and 7) radii of curvature less than the corresponding radii of curvature of the wall 102 of the trunnion. The neutral fibre 9 is circular.

These conditions are such that, under load (FIG. 7), whereas the neutral fibre 9 is deformed in accordance with the curve b of FIG. 4, the surface 104, which undergoes a corresponding deformation assumes a shape which is substantially of revolution and substantially complementary to the wall 102, which does not deform.

There will now be described with reference to FIGS. 8, 9 and 10, a first method for grinding the inner peripheral wall of the roller segment 106 of FIGS. 6 and 7.

According to this method, there is produced a multiple annular blank 1 having on its inner peripheral wall three recesses 2 at 120° to one another and on its toric outer peripheral wall 4 three pairs of flat surfaces 3 defining V-shaped recesses in facing relation to the recesses 2. Thus, the multiple blank 1 comprises three individual blanks of a roller segment. In the considered stage of FIGS. 8 and 9, the multiple annular blank has been subjected to its hardening quenching.

According to the method, the annular blank 1 is placed 10 in a chuck 6 between three jaws 5 spaced 120° apart about the common axis of the blank and chuck. Each jaw 5 bears against the outer surface of one of the individual blanks at equal distance from the two circumferential ends of the latter. The chuck 6 and the jaws 5 are part of an interior grinder whose grinding wheel 7 has an outside diameter which is less than the diameter of the inner peripheral wall of the multiple blank 1.

During this grinding, the jaws exert in the median axial plane of the segments, which will be in service their insertion plane 113, a radial force Q corresponding to a typical load which will be applied in service to each of the segments in the homokinetic joint.

The application of the three forces Q determines at each of the circumferential ends of each segment, in the tongue portion 8 which connects it to the adjacent segment, a force F which is oriented tangentially in the direction of the compression of the segment.

As will be understood from FIG. 10, each force F determines at each point (for example P1, P2, P3) of the neutral fibre of the blank, a bending moment which is equal to F multiplied by the distance (eg. h1, h2, h3) from the considered point to the line of action of the force F. Bearing in mind the curvature of the neutral fibre 9, the value of the bending moment at each point is substantially proportional to the square of the angle (for example a1, a2, a3) between this point and the closest circumferential end. Likewise, the radial component of F which generates the sheer stress resulting from F, is zero at the circumferential end of the segment and steeply increases as a function of the angle a. There is achieved in this way in the blank a distribution of the bending moments and shear forces which resembles that of a load distributed over the inner peripheral wall. During the machining, the deformation of the neutral fibre 9 therefore resembles that which will occur in service.

Under this load resembling the real load, the grinding wheel 7 imparts to the inner peripheral wall of the annular blank 1 a shape of revolution about the axis of the blank which shape of revolution is interrupted by the recesses 2 and by possible lubricating grooves 111.

As shown in FIG. 9, each jaw 5 has a notch 112 whose cylindrical section marries up with the section of the outer surface 4 of the roller segment in the axial insertion plane. As viewed in the plane perpendicular to the axis (FIG. 8), the jaws 5 bear tangentially against the surface 4 of the roller segments.

As shown diagrammatically in FIG. 9: the jaws 5 may be wedges whose sloping side 116 is located radially outside and bears against a side 117, having the same slope, of an interior axial groove 118 of the chuck 6.

Thus the force Q applied to each elementary blank is produced by a force applied axially on the three wedges in the direction of convergence of the three sides 117 of the grooves 118. Means (not shown) maintain the three wedges 5 in axial positions which are always concordant so that the axis of the blank is always parallel to the axis of the grinding wheel 7, as is the case in conventional chucks.

After grinding, the jaws 5 are released and the three individual blanks are separated by cutting or breaking in the region of the tongue portions 8. The neutral fibre of each segment thus formed resumes its circular shape while the inner peripheral wall changes from a shape of revolution to a shape such as that shown in FIG. 6. The amplitude of the compensation obtained is proportional to the forces Q and takes into account cumulated deformations of bending and shear.

The radial distance of the axis of the tongue portions 8 to the neutral fibre of the section of the individual blanks determines the relative extent of the bending and shear compensations. When the distance j (FIG. 8) between the axis of the tongue portions 8 and the axis of the blank 1 exceeds the radius r of the neutral fibre 9, the fraction of the bending compensation increases and vice-versa.

There will now be described with reference to FIGS. 11 and 12 another method for producing the segments shown in FIG. 6

In this method, after hardening of three segment blanks 10 having a spherical inner peripheral wall and a toric outer wall, the blanks are placed in a toric bore 13 of a corresponding section of a chuck 12 (see FIG. 12). The bore 13 is radially outwardly hollowed out so that there remain only three narrow bearing surfaces relative to the circumferential direction 15. In each plane perpendicular to the axis, the diameter of the toric bore of the chuck is slightly larger than the corresponding outside diameter of the segments by about 0.04 to 0.08 mm.

As shown in FIG. 12, the chuck 12 comprises radial ducts 119 in which jaws 11 are slidably mounted and may be radially inwardly biased. The jaws 11 have in the bore 13 end portions which narrow in the direction toward the axis when viewed along the axis (FIG. 11). These end portions are interposed between the neighbouring end surfaces of corresponding slope of the successive blanks 10. With a wedging effect, they exert on the end portions of these blanks tangential forces F which deform the blanks 10 in the direction for increasing their radius of curvature and consequently urges each blank 10 against its three respective bearing surfaces 14 and 15, the bearing surface 14 then exerting by reaction on the outer surface of the blank a localized force which is radially inwardly directed.

In this way each blank 10 is subjected to a load which is of the same type as that described with reference to FIG. 10.

Then, the toric grinding wheel 16 of an inner grinding head comes into a finishing action by radially plunging. When this has been done, the jaws 11 are released and the three segments 10 assume the shape shown in FIG. 6.

There will now be described with reference to FIGS. 13 and 14 a third manner of obtaining the segments of the type shown in FIGS. 6 and 7.

After hardening, the blanks 10 are placed in a rack 17 comprising toric recesses 18 having the same cross-sectional shape as the segments, disposed side by side and ground to an outside diameter of the torus which is larger by 0.02 to 0.10 mm than that of the segments. Two longitudinal grooves 19 have been machined in the bottom of the rack so that there are only two bearing surfaces 20 remaining for the circumferential end portions of the segments and a narrow central bearing surface 21 relative to the circumferential direction. Furthermore, the bearing surface 21 has been made cylindrical with an axis perpendicular to the axis 103 of the blanks. A fixed stop 22 provides a support for one of the circumferential ends of all the segments 10. A common control shaft 24 carries for each segment 10 a movable stop 23 and may be actuated in such manner that the stops 23 come to apply on the other circumferential end of the segments 10 the tangential force F so as to bias, as described with reference to FIG. 10, the segments 10 in the direction for increasing their radius of curvature. The circumferential ends of the segments 10 are then in contact with the bearing surfaces 20 by means of a radial reaction force applied by the cylindrical bearing surface 21 in the direction toward the axis 103 in the median axial plane of the roller segment.

A grinding wheel 25 of a large diameter, whose shaft 141 is perpendicular to the axis 103 and to the direction of alignment of the blanks 10 and parallel to the axes of the bearing surfaces 21, and whose periphery has a circular section having a very precise radius, effects in succession a "run-through" grinding of the blanks 10 held in the rack during the translation of the grinder table on which the rack 17 is mounted.

After release of the movable stop 23, the inner peripheral wall of the segments changes from a cylindrical contour to the required contour diagrammatically shown in FIG. 6.

There will now be described with reference to FIGS. 15 and 16 a fourth manner of obtaining a segment of the type shown in FIG. 6 and in particular a segment 106 whose inner peripheral wall 104 is pseudo-spherical (i.e. spherical apart from the compensations) and whose outer surface is toric. This method employs a grinding wheel 27 of the dome type operating by generation.

For this purpose, a blank 26 is placed in a rotary chuck in such manner that a axis of rotation 121 of the chuck 122 passes through the centre 0 of the spherical grinding to be carried out on the wall 104. One of the circumferential ends of the segment 26 is circumferentially keyed in a notch 32 in the chuck 122 which defines for the outer surface of the segment 26 an end bearing surface 123 which is narrow relative to the circumferential direction. Beyond the notch 32, the chuck 122 forms a fixed claw 30 against which the corresponding circumferential end of the blank 26 can bear. At the other circumferential end of the blank 26 the chuck 122 carries a hydraulically controlled claw 28 which exerts a controlled force F applied tangentially to the circumferential end of the segment and determining a tangential reaction of the same magnitude on the part of the fixed claw 30 on the other circumferential end. These forces F apply the segment 26 against a central concave cylindrical bearing surface 31 and, at the same time, elastically open the blank until it balances the predetermined force F for obtaining the desired correction. This means of metering the correction has the advantage over the methods illustrated in FIGS. 11 and 13 of ensuring that the correction produced does not depend on the tolerances of the machining of the outer torus of the segments.

The geometrical axis 121 of rotation of the chuck 122 extends in the median axial plane of the segment 26 (the future insertion plane). The axis of rotation 124 of the grinding wheel 27 obliquely intersects the axis 121 at the centre 0. When grinding, the shaft of the grinding wheel advances axially without moving away from the centre 0 of the inner peripheral wall of the segment 26. When the controlled claw 28 is disengaged, the perfectly spherical ground wall 104 becomes altered by the elastic return and assumes the desired section diagrammatically shown in FIG. 6.

According to a second embodiment of the device according to the invention (FIGS. 17 and 18), the wall 104 of the segment 106 is of revolution about the journalling axis when the device is unloaded. On the other hand, the outer wall 102 of the trunnion 101 has a section complementary to deform the section of the wall 104 deformed under the effect of the desired loading in service, i.e. with a substantially even distribution of the pressure between the walls 102 and 104. In addition, the trunnion 101 is substantially undeformable relative to the variations in the radius of curvature of its wall 102 under the effect of the prescribed loads.

Thus, as shown in a very exaggerated manner in FIG. 18, when under load, the walls 102 and 104 are very close to being perfectly complementary.

There will now be described with reference to FIGS. 19 and 20 a method for obtaining a tripod element 35 each trunnion 101 of which conforms to the section diagrammatically shown in FIGS. 17 and 18.

According to this method, the trunnion 34 is held on the spindle of the grinding machine by a spreading tool—or expansible tongs—36 comprising two diametrically opposed longitudinal edges 37 which come to exert in an axial bore 39 of one of the trunnions 101 forces Q which are directed radially outwardly along two generatrices of the bore 39 located in the plane which will be the plane of insertion of the roller where the two roller segments cooperate with this trunnion. This plane is moreover the median plane of the tripod element, passing through the three axes of the three trunnions. In order to ensure the correct positioning of the edges 37 in the bore 39, the closed end of the tongs, directed towards the interior of the tripod element, has a V-shaped notch 41 which caps the edge of intersection of the bores 42 of the other two trunnions of the tripod element. From the aforementioned closed end, the tongs 37 are separated into two branches 126 each carrying one of the edges 37 and presenting in confronting relation two oblique surfaces 127 which converge toward the interior of the tripod element. Inserted between these two surfaces 127 is a wedge 128 which bears against the latter by two surfaces 129 of corresponding obliqueness. In order to produce the forces Q, the wedge 128 is biased axially inwardly in the direction of the arrow shown in FIG. 19.

The opposed oblique surfaces of the wedge are connected to each other on each side by two cylindrical surfaces 40 having a diameter substantially equal to the diameter of the bore 39, apart from a slight radial clearance to enable the trunnion to be freely deformed under the effect of the forces Q. The surfaces 40 center the wedge in the bore 39, while means (not shown) position the tongs relative to the wedge and ensure the centering of the tongs in the bore 39.

The two forces Q, constituting the localized radial forces and determining at 90° from their point of application on each side of their plane of application two tangential tensile forces T, constitute a load ovalizing the trunnion by reducing its radius of curvature in the vicinity of the edges 37. By analogy with the explanations given to FIG. 10, it will be understood that the radial deflection the trunnion undergoes on each side of each edge 37 substantially abides by the curve b of FIG.

4. The forces Q are so adjusted that the value of this deflection at each point substantially corresponds to that which the roller segment would undergo under the effect of the load to which it is subjected in service. As the trunnion must be substantially undeformable with respect to variations in the radius of curvature under load in service, the loads Q applied during the machining are greater than the forseeable load in service.

With this assembly effected, the tongs 36 and therewith the tripod element 35 are made to rotate about the axis 103 of the assembly. At the same time, there is made to rotate about an axis 130 parallel to the axis 103 a grinding wheel 131 whose periphery, of suitable section, is tangent to the outer peripheral wall of the trunnion. In this way a shape is given to the wall which is of revolution about the axis 103 in the example in accordance with a rectilinear section so as to produce a cylindrical wall. However, a spherical wall could be just as easily produced by employing a grinding wheel having a circular section.

When the grinding has terminated, the wedge 128 is released and the wall 102 assumes the shape shown diagrammatically in FIG. 17 which is symmetrical on each side of the plane 132 (FIG. 20) which intersects in a perpendicular manner the median plane of the tripod element along the axis 103.

According to a third embodiment of the device (FIG. 21), in the unloaded state, the walls 102 and 104 are both of revolution about the axis 103 and complementary to each other. On the other hand, the trunnion 101 has geometrical particularities which impart thereto with respect to variations in the radius of curvature of its wall 102, a suitable deformability which enables it to conform, under load, to the deformed shape of the wall 104 of the segment 106.

This embodiment is shown in more detail in FIG. 23 in the case of a tripod element 43. Each trunnion 101 of this tripod element has an oblong bore 44 obtained by cold stamping the trunnions. The bore 44, whose large axis pertains to the plane 113, imparts to the wall of the trunnion an important reduction in the bending rigidity in two diametrically opposed regions 46 in the median plane of the tripod element, i.e. exactly in the region of the concentrated load Q applied to the segments 106 (only one of which is shown). In the direction away from these regions 46, the flexibility gradually decreases on each side of the regions.

Thus, under load (FIG. 22), the elastic deformation of the wall of the trunnion has a shape very close to the required law (curve b in FIG. 4) for achieving the hydrodynamic lubrication of the bearing.

A homokinetic joint 47 has been partly shown in FIGS. 24 and 25 which comprises a tripod element 133 whose trunnions 101 are each surrounded to the extent of 360° by a roller 48 whose outer surface 134 is spherical and whose inner peripheral wall 104 is cylindrical. Each roller 48 is interposed between two cylindrical tracks 136 whose common axis passes, to within the clearances, through the center of the spherical surface 134. Thus, the roller 48 may roll along either track 136, swivel between the tracks and pivot and slide on the trunnion. Depending on the direction of the load, the roller bears against one of the tracks 136 and defines a clearance (exaggerated in FIGS. 24 and 25) with the other track. Likewise, the trunnion bears against the inner peripheral wall 104 of the roller adjacent to the track 136 against which the roller bears without clearance.

In order to ensure that the zone of contact between the roller and trunnion has a sufficient circumferential extent to ensure the hydrodynamic lubrication, the trunnion is given the shape described with reference to FIGS. 17 and 18, while the trunnion is substantially undeformable under the loads Q liable to be encountered in service, as concerns variations in radius of curvature of its peripheral wall. The inner peripheral wall of the roller is of revolution.

In order to give the trunnion the outer shape of FIGS. 17 and 18, it is machined on a special machine capable of grinding in accordance with a section satisfying the desired curve. Such machines are known for example from FR-A-1 401 983.

FIGS. 26 and 27 show a part of a homokinetic joint in which the tripod element 133 carries three trunnions 101 whose outer peripheral wall 102 is spherical, in the same way as the inner peripheral wall 104 of each of two segments 106 which bear by their toric outer surface 4 in cylindrical rolling tracks 108 of corresponding section.

In this embodiment, it is possible to arrange that the inner peripheral walls 104 of the segments 106 have the special shape prescribed in FIGS. 6 and 7, unless the trunnions 101, obtained by a final grinding on a special grinding machine of the type disclosed in FR-A-1 401 983, do not have the special shape prescribed in FIGS. 17 and 18.

The trunnions of the joints described with reference to FIGS. 24 to 27 advantageously include one or more lubricating grooves 55, 55a preferably disposed in planes passing through the axis of the trunnion. The grooves 55 open out at their ends on each side of the segment. The grooves 55a constituting another embodiment are closed at their ends and fed with lubrication through a radial bore 55b.

It must be understood that the scope of the invention is not intended to be limited to the described and illustrated embodiments.

For example, the method of FIGS. 8 and 9 is applicable for producing segments having spherical inner walls by means of a grinding wheel such as the wheel 16 of FIG. 12, and, inversely, the method of FIGS. 11 and 12 is applicable for producing segments having a cylindrical inner wall by means of a grinding wheel such as the wheel 7 of FIGS. 8 and 9.

It may also be advantageous to effect the correction of the bearing section on both the trunnion and the inner peripheral wall of the segments or roller by means of the described methods.

In the various figures, the deviations that some of the bearing surfaces present relative to a section of revolution are highly exaggerated. Furthermore, the curve b of FIG. 4 concerns the theoretical case in which the insertion of the roller would be limited to a single plane. Bearing in mind the very small radial deflections of the roller, this approximation is already excellent. However, in actual fact, the roller bears tangentially against its rolling track and this ma have an effect on the shape of the curve in the vicinity of its origin and render the observed deflections less than the theoretical deflections at each point of the curve. However, note that the methods of FIGS. 8, 9, 11, 12 and 13 to 16 take this phenomenon into account since, when machining under load, the outer surface of the roller is also in tangential bearing relation. The other methods described may also take this into account. For example, in the method of FIGS. 19 and 20, it would be possible to substitute ribs having a rounded apex for the edges 37. In the methods employing grinding on a special machine, it is of course possible to alter the curve produced in consequence.

When the compensated peripheral wall is that of the rolling element (embodiment of FIGS. 6 and 7), the compensation is only ideal if the rolling element is in the mean position, i.e. if the real plane of insertion corresponds to the plane of insertion relative to which the compensation of shape was achieved. However, in homokinetic joints, operation of the joint at a large flexing angle, resulting in a large displacement of the roller relative to its mean position, represents only a very small percentage of the total operating time and occurs mostly under low torque.

I claim:

1. A load transmission device, comprising:
   means defining a track;
   a trunnion having a peripheral wall; and
   a rolling element having an inner peripheral wall in rotatively mounted contact with said peripheral wall of said trunnion about an axis of rotation, and an outer wall for rolling on said track to transfer a load between said track and said trunnion;
   wherein said trunnion and said rolling element in a first state have no load on said rolling element from said trunnion and in a second state have a load on said rolling element from said trunnion, one of said rolling element and said trunnion in said second state being deformed by bending moment and shear forces due to said load such that said inner peripheral wall of said rolling element substantially conforms to said peripheral wall of said trunnion, and one of said rolling element and said trunnion in said first state being undeformed and separated from the other of said rolling element and said trunnion along said inner peripheral wall of said rolling element and said peripheral wall of said trunnion a distance defined by an amount of compensation corresponding to the sum of the effects of said bending moment and said shear force due to said load on said one of said rolling element and said trunnion.

2. The load transmission device as set forth in claim 1, wherein:
   said peripheral wall of said trunnion comprises a generatrix of revolution about said axis of rotation, and said peripheral wall of said trunnion has a rigidity substantially greater than the rigidity of said inner peripheral wall of said rolling element with respect to variation in the radius of curvature of said walls.

3. The load transmission device as set forth in claim 1, wherein:
   in said first state, said inner peripheral wall of said rolling element is a generatrix of revolution about said axis of rotation and said trunnion has a rigidity with respect to variations in the radius of curvature of said peripheral wall of said trunnion substantially greater than the rigidity of said inner peripheral wall of said rolling element with respect to variations in the radius of curvature.

4. The load transmission device as set forth in claim 1, wherein:
   said peripheral walls of said trunnion and said rolling element are both generatrixes of revolution about said axis of rotation in said first state, and said trunnion has, at an axial plane passing through said axis of rotation and a line of contact between said peripheral wall of said trunnion and said inner peripheral wall of said rolling element, a predetermined flexibility with respect to variations in the radius of curvature of said peripheral wall of said trunnion at said axial plane and at said peripheral wall, said flexibility being at a maximum at said plane and gradually decreasing from either side of said axial plane along said peripheral wall of said trunnion.

5. The load transmission device as set forth in claim 4, wherein:
   said trunnion has an inner hollow oblong cross-sectional shape having a major axis contained in said axial plane.

6. A transmission joint, comprising:
   a first structural element having an axis of rotation and a plurality of pairs of tracks extending thereon;
   a second structural element, said second structural element having a plurality of substantially radially extending trunnions, each said trunnion having an outer peripheral wall, each said trunnion having an outer peripheral wall, and each said trunnion being located between the tracks of a respective said pair of tracks;
   a rolling element having an outer wall interposed between each said track and its respective said trunnion such that said outer wall is in rolling engagement with said tracks, each said track forming with its respective said rolling element and trunnion, a load transferring arrangement, wherein said rolling element of each said load transferring arrangement has an inner peripheral wall mounted so as to be in rotatable contact with said peripheral wall of its respective said trunnion, rotatable about an axis of rotation;
   wherein each said trunnion and its respective said rolling element in a first state have substantially no load on said rolling element from said trunnion and in a second state have a load on said rolling element from said trunnion, one of said rolling element and said trunnion in said second state being deformed by bending moment and shear forces due to said load such that said inner peripheral wall of said rolling element substantially conforms to said peripheral wall of said trunnion, and said one of said rolling element and said trunnion in said first state being undeformed and separated from the other of said rolling element and said trunnion along said inner peripheral wall of said rolling element and said peripheral wall a distance defined by an amount of compensation corresponding to the sum of the effects of said bending moment and said shear force due to said load on said one of said rolling element and said trunnion.

7. The transmission joint as set forth in claim 6, wherein:
   in said first state, each said inner peripheral wall of each said rolling element is a generatrix of revolution about said axis of rotation of said rolling element and each said trunnion has a rigidity with respect to variations in the radius of curvature of said peripheral wall of said trunnion substantially greater than the rigidity of said inner peripheral wall of said rolling element with respect to variations in the radius of curvature.

8. The transmission joint as set forth in claim 6, wherein:
   said peripheral walls of each said trunnion and each said respective rolling element are both generatrixes of revolution about said axis of rotation of said rolling element in said first state, and said trunnion has, at an axial plane passing through said axis of rotation and a line of contact between said peripheral wall of said rolling element, a predetermined flexibility with respect to variations in the radius of curvature of said peripheral wall of said trunnion at said axial plane and at said peripheral wall, said flexibility being at a maximum at said axial plane and gradually decreasing from either side of said axial plane along said peripheral wall of said trunnion 9. The transmission joint as set forth in claim 8, wherein:
each said trunnion has an inner hollow of oblong cross-sectional shape having a major axis contained in said zxial plane.

* * * * *